(12) United States Patent
Kitade et al.

(10) Patent No.: US 10,926,519 B2
(45) Date of Patent: Feb. 23, 2021

(54) LAMINATED FOAM SHEET AND MOLDED ARTICLE THEREOF

(71) Applicant: SEKISUI PLASTICS CO., LTD., Osaka (JP)

(72) Inventors: Hiroaki Kitade, Koga (JP); Kouji Ueda, Koga (JP); Yosuke Kawamorita, Koga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 16/769,018

(22) PCT Filed: Dec. 5, 2018

(86) PCT No.: PCT/JP2018/044682
§ 371 (c)(1),
(2) Date: Jun. 2, 2020

(87) PCT Pub. No.: WO2019/111930
PCT Pub. Date: Jun. 13, 2019

(65) Prior Publication Data
US 2020/0376820 A1  Dec. 3, 2020

(30) Foreign Application Priority Data

Dec. 7, 2017  (JP) .............................. JP2017-235344

(51) Int. Cl.
*B32B 27/08* (2006.01)
*B32B 27/32* (2006.01)
(Continued)

(52) U.S. Cl.
CPC ................ *B32B 27/08* (2013.01); *B32B 5/18* (2013.01); *B32B 27/065* (2013.01); *B32B 27/32* (2013.01);
(Continued)

(58) Field of Classification Search
CPC ......... B32B 27/065; B32B 5/18; B32B 27/32; B32B 2307/744; B32B 2266/08
See application file for complete search history.

(56) References Cited

U.S. PATENT DOCUMENTS

2005/0255318 A1  11/2005 Czerny
2015/0224745 A1   8/2015 Morita et al.

FOREIGN PATENT DOCUMENTS

CN  201553062   8/2010
JP  51-136381  11/1976
(Continued)

OTHER PUBLICATIONS

Office Action issued in Taiwanese Counterpart Pat. Appl. No. 107143663, dated Jun. 17, 2019, along with an English translation of the Search Report thereof.
(Continued)

*Primary Examiner* — Hai Vo
(74) *Attorney, Agent, or Firm* — Greenblum & Bernstein, P.L.C.

(57) ABSTRACT

A laminated foam sheet includes a foam layer, a first non-foam layer positioned on one side of the foam layer, and a second non-foam layer positioned on another side of the foam layer, in which the foam layer includes a polyolefin-based resin, the foam layer has a thickness of 2.0 to 6.0 mm, the foam layer has a closed cell ratio of 70% or more, the first non-foam layer includes a non-cross-linked olefin-based elastomer, the first non-foam layer has a maximum static friction coefficient determined by JIS K7125 of 2.0 or more, the second non-foam layer has a maximum static friction coefficient determined by JIS K7125 of 1.0 or less, and a ratio represented by [basis weight of first non-foam layer (a)]/[basis weight of second non-foam layer (b)] is 0.5 to 2.0.

9 Claims, 5 Drawing Sheets (51) Int. Cl.
    *B32B 5/18* (2006.01)
    *B32B 27/06* (2006.01)
(52) U.S. Cl.
    CPC ..... *B32B 2266/08* (2013.01); *B32B 2307/558* (2013.01); *B32B 2307/732* (2013.01); *B32B 2307/744* (2013.01); *B32B 2471/04* (2013.01); *B32B 2605/003* (2013.01)

(56) References Cited

FOREIGN PATENT DOCUMENTS

| | | |
|---|---|---|
| JP | 08-309901 | 11/1996 |
| JP | 2005-119147 | 5/2005 |
| JP | 2006-500245 | 1/2006 |
| JP | 2006-130814 | 5/2006 |
| JP | 2007-131766 | 5/2007 |
| JP | 2009-184181 | 8/2009 |
| JP | 2014-009277 | 1/2014 |
| JP | 2014-034171 | 2/2014 |
| JP | 2014-180818 | 9/2014 |
| JP | 2015-178260 | 10/2015 |
| JP | 3213995 | 12/2017 |
| TW | 2017/10305 | 3/2017 |
| WO | 2014/041750 | 3/2014 |
| WO | 2019/077944 A1 | 4/2019 |

OTHER PUBLICATIONS

International Search Report issued in International Pat. Appl. No. PCT/JP2018/044682, dated Mar. 12, 2019, along with an English translation thereof.

WO/ISA issued in International Pat. Appl. No. PCT/JP2018/044682, dated Apr. 8, 2020, along with an English translation thereof.

Notice of Allowance, Japanese Patent Office, Application No. 2019-558243, dated Jun. 2, 2020, English translation.

LAMINATED FOAM SHEET AND MOLDED ARTICLE THEREOF

TECHNICAL FIELD

The present invention relates to a laminated foam sheet and a molded article thereof.

Priority is claimed on Japanese Patent Application No. 2017-235344 filed on Dec. 7, 2017, the content of which is incorporated herein by reference.

BACKGROUND ART

In the related art, there is known a laminated foam sheet provided with a foam layer using a thermoplastic resin as a base material resin and a non-foam layer using a thermoplastic resin as a base material resin. Since such a laminated foam sheet is excellent in heat resistance and light weight, the laminated foam sheet is used as a raw material for food packaging containers, floor mats for a vehicle, and the like.

There is a demand for food packaging containers, floor mats for a vehicle, and the like to have non-slip properties (a grip property) when installed.

Patent Literature 1 proposes a foam laminate having a foam layer and an adhesive layer containing a synthetic rubber. In addition, Patent Literature 2 proposes a laminated foam sheet having a foam body layer and a thermoplastic elastomer layer. According to the foam laminates of Patent Literatures 1 and 2, it is possible to realize a grip property.

CITATION LIST

Patent Literature

[Patent Literature 1]
Japanese Unexamined Patent Application, First Publication No. 2014-180818
[Patent Literature 2]
Japanese Unexamined Patent Application, First Publication No. 2009-184181

SUMMARY OF INVENTION

Technical Problem

Here, there is a demand for a laminated foam sheet not only to have a grip property but also to have strength.

In addition, if the laminated sheet is curled, there is a concern that the curl may remain even after molding, thus, there is also a demand for the laminated foam sheet to have a non-curling property (a curl suppressing property).

However, Patent Literatures 1 and 2 do not discuss strength or a curl suppressing property.

The present invention was made in view of the above circumstances and has an object of providing a laminated foam sheet having a non-slip surface, excellent strength, and an excellent curl suppressing property, and a molded article thereof.

Solution to Problem

As a result of intensive studies, the present inventors found that it is possible to solve the problems described above by using a laminated foam sheet having a structure including three resin layers each satisfying specific requirements.

The present invention has the following aspects.

[1] A laminated foam sheet including a foam layer, a first non-foam layer positioned on one surface of the foam layer, and a second non-foam layer positioned on another surface of the foam layer, in which the foam layer includes a polyolefin-based resin, the foam layer has a thickness of 2.0 to 6.0 mm, the foam layer has a closed cell ratio of 70% or more, the first non-foam layer includes a non-cross-linked olefin-based elastomer, the first non-foam layer has a maximum static friction coefficient determined by JIS K7125 of 2.0 or more, the second non-foam layer has a maximum static friction coefficient determined by JIS K7125 of 1.0 or less, and a ratio represented by [basis weight of first non-foam layer (a)]/[basis weight of second non-foam layer (b)] is 0.5 to 2.0.

[2] The laminated foam sheet according to [1], in which a difference between a melting point of a resin forming the first non-foam layer and a melting point of a resin forming the second non-foam layer is within 10° C.

[3] The laminated foam sheet according to [1] or [2], in which the polyolefin-based resin is a polypropylene-based resin.

[4] The laminated foam sheet according to any one of [1] to [3], in which the second non-foam layer has a piercing strength determined by JIS K7171 of 20 N or more.

[5] The laminated foam sheet according to any one of [1] to [4], in which a melt mass flow rate of the polyolefin-based resin is preferably 5.0 g/10 min or less, more preferably 0.1 g/10 min or more and 5.0 g/10 min or less, and even more preferably 0.5 g/10 min or more and 4.0 g/10 min or less.

[6] The laminated foam sheet according to any one of [1] to [5], in which a melting point of the polyolefin-based resin is preferably 150° C. or higher and 170° C. or lower, and more preferably 155° C. or higher and 165° C. or lower.

[7] The laminated foam sheet according to any one of [1] to [6], in which a content of the polyolefin-based resin in the foam layer is preferably 80% by mass or more, more preferably 90% by mass or more, and even more preferably 100% by mass, with respect to 100% by mass of the resin forming the foam layer.

[8] The laminated foam sheet according to any one of [1] to [7], in which a content of the non-cross-linked olefin-based elastomer in the first non-foam layer is preferably 60% by mass or more, more preferably 80% by mass or more, and even more preferably 100% by mass, with respect to 100% by mass of the resin forming the first non-foam layer.

[9] The laminated foam sheet according to any one of [1] to [8], in which a gel fraction of the non-cross-linked olefin-based elastomer is preferably 3.0% by mass or less, and more preferably 1.0% by mass or less.

[10] The laminated foam sheet according to any one of [1] to [9], in which a basis weight (a) of the first non-foam layer is preferably 100 to 400 g/m², and more preferably 130 to 300 g/m².

[11] The laminated foam sheet according to any one of [1] to [10], in which the second non-foam layer includes a filler.

[12] The laminated foam sheet according to any one of [1] to [11], in which a basis weight (b) of the second non-foam layer is preferably 100 to 400 g/m², and more preferably 130 to 300 g/m².

[13] A molded article obtained by molding the laminated foam sheet according to anyone of [1] to [12].

[14] The molded article according to [13], in which the first non-foam layer is formed on a surface facing downward in a vertical direction.

[15] The molded article according to [13] or [14], which is a floor mat for a vehicle.

[16] The molded article according to [13] or [14], which is an undercover for a vehicle.

[17] The molded article according to [13] or [14], which is a luggage tray for a vehicle.

Advantageous Effects of Invention

According to the present invention, it is possible to provide a laminated foam sheet having a non-slip surface, excellent strength, and an excellent curl suppressing property, and a molded article thereof.

DESCRIPTION OF EMBODIMENTS

<Laminated Foam Sheet>

Figure 1:
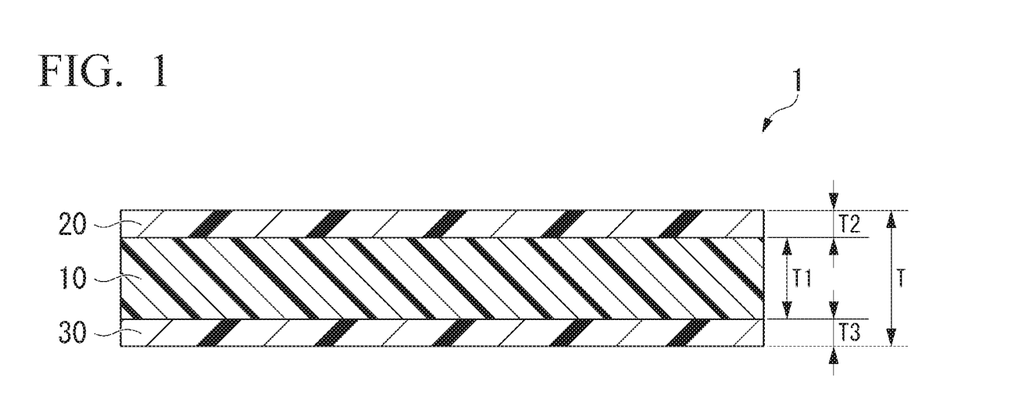
FIG. 1 is a cross-sectional view showing an example of a laminated foam sheet of the present invention.

As shown in FIG. 1, a laminated foam sheet of the present invention is provided with a foam layer 10, a first non-foam layer 20 provided on one surface of the foam layer 10, and a second non-foam layer 30 provided on the other surface of the foam layer 10. A laminated foam sheet 1 has a three-layer structure.

Here, in FIG. 1, the thickness direction is enlarged and illustrated.

<Foam Layer>

In the foam layer, a resin composition is foamed. The resin composition contains a polyolefin-based resin and a foaming agent.

Examples of the polyolefin-based resin include homopolymers or copolymers of olefin-based monomers such as ethylene and propylene, copolymers of olefin-based monomers, which are the main component, and vinyl monomers polymerizable with the olefin-based monomers, and the like. The polyolefin-based resins may be used alone as one type or in a combination of two types or more. In particular, a polyethylene-based resin and a polypropylene-based resin are preferable, and a polypropylene-based resin is more preferable.

Examples of the polyethylene-based resin include a low-density polyethylene resin (LDPE) in which ethylene is polymerized under high pressure and a long chain branch is formed in the molecule, a high-density polyethylene resin (HDPE) with a density of 0.942 g/cm$^3$ or more in which ethylene is polymerized under medium to low pressure using a Ziegler-Natta catalyst or a metallocene catalyst, a linear low-density polyethylene resin (LLDPE) with a density of less than 0.942 g/cm$^3$ in which a small amount of an α-olefin such as 1-butene, 1-hexene, or 1-octene is added in a HDPE polymerization process to form a short chain branch in the molecule, and the like.

As the polypropylene-based resin, a high melt tension polypropylene (HMS-PP) resin is preferable. A high melt tension polypropylene resin is a polypropylene resin for which tension in the molten state is increased by mixing high molecular weight components or components having a branched structure into a polypropylene resin, or by copolymerizing a long-chain branched component with polypropylene. High melt tension polypropylene resins are commercially available and examples thereof include "WB130HMS", "WB135HMS", and "WB140HMS" manufactured by Borealis AG; "Pro-fax F814" manufactured by Basell; "FB3312", "FB5100", "FB7200", "FB9100", "MFX8", and "MFX6" manufactured by Japan Polypropylene Corporation, and the like.

Usually, it is possible to determine whether or not the polypropylene-based resin is a high melt tension polypropylene resin not only by the difference in polymer structure, but also by the magnitude of the melt tension. For example, when the melt tension is 5 cN or more, it is possible to determine that the polypropylene-based resin is a high melt tension polypropylene resin.

The melt tension of the high melt tension polypropylene resin is preferably 10 cN or more and 30 cN or less, for example. At the lower limit value described above or more, it is easier to increase the strength of a foam layer. At the upper limit value described above or less, it is easier to improve the thermoformability.

It is possible to measure the melt tension of the resin as follows using a measuring device "Capillograph PMD-C" manufactured by Toyo Seiki Seisaku-sho, Ltd.

First, in a state of being heated to 230° C. and melted, a sample resin is extruded in a string shape from a capillary (diameter 2.095 mm, length 8 mm) of the piston extrusion type plastometer of the apparatus described above, while maintaining the lowering speed of the piston at a constant speed of 10 mm/min. Next, the string-shaped object is passed through a tension detecting pulley positioned 35 cm below the nozzle, and then taken up using a take-up roll while increasing the take-up speed from an initial speed of 5 m/min at an acceleration of approximately 66 m/min$^2$. Then, when performing a test ending with the cutting of the string-shaped object, the maximum tension immediately before the break detected by the tension detecting pulley is used as the melt tension of the sample resin.

The melt mass flow rate (MFR) of the polyolefin-based resin is preferably 5.0 g/10 min or less, more preferably 0.1 g/10 min or more and 5.0 g/10 min or less, and even more preferably 0.5 g/10 min or more and 4.0 g/10 min or less. When the MFR is the lower limit value described above or more, the closed cell ratio of the foam layer is easily set to 70% or more. When the MFR is the upper limit value described above or less, it is easier to increase the strength of the foam layer.

MFR is a numerical value representing the fluidity when melting the thermoplastic resin. The MFR is represented by the amount of resin when a resin melted in a cylinder is extruded every 10 minutes from a die having a specified diameter installed at the bottom of the cylinder by a piston under a constant temperature and load conditions.

In this specification, the MFR is a numerical value at 230° C. and 0.23 MPa.

The melting point of the polyolefin-based resin is preferably 150° C. or higher and 170° C. or lower, and more preferably 155° C. or higher and 165° C. or lower. When the melting point of a polyolefin-based resin is the lower limit value described above or more, it is easier to increase the strength of the foam layer. When the melting point of the polyolefin-based resin is the upper limit value described above or less, it is easier to improve the thermoformability.

The melting point of the polyolefin-based resin is measured by the method described in JIS K7121: 1987 "Method for Measuring Transition Temperature of Plastic".

The content of the polyolefin-based resin is preferably 80% by mass or more with respect to 100% by mass of the resin forming the foam layer, more preferably 90% by mass or more, and even more preferably 100% by mass.

The resin composition may include another resin. Examples of other resins include polystyrene-based resins, polyester-based resins, and the like.

Examples of polystyrene-based resins include homopolymers or copolymers of styrene-based monomers, copolymers of styrene-based monomers and other vinyl-based monomers, mixtures thereof, and the like. Polystyrene-based resins may be used alone as one type or in a combination of two types or more.

As the polystyrene-based resin, a structural unit based on a styrene-based monomer is preferably included as 50% by mass or more with respect to all the structural units of the polystyrene-based resin, more preferably included as 70% by mass or more, and even more preferably included as 80% by mass or more.

In addition, the mass average molecular weight of the polystyrene-based resin is preferably 200,000 to 400,000, and more preferably 240,000 to 400,000. The mass average molecular weight is a value obtained by converting a value measured by GPC (gel permeation chromatography) based on a calibration curve using standard polystyrene.

Examples of the styrene-based monomer homopolymer or copolymer include homopolymers or copolymers of styrene-based monomers such as styrene, α-methylstyrene, vinyltoluene, chlorostyrene, ethylstyrene, i-propylstyrene, dimethylstyrene, and bromostyrene. Among these, examples having a structural unit based on styrene as 50% by mass or more with respect to all of the structural units are preferable, and polystyrene (a homopolymer) is more preferable.

In addition, high impact polystyrene including a rubber component may be used as the polystyrene-based resin.

Examples of copolymers of styrene-based monomers and other vinyl-based monomers include styrene-(meth)acrylic acid copolymers, styrene-(meth)acrylic acid ester copolymers, styrene-vinyl chloride copolymers, styrene-butadiene copolymers, styrene-acrylonitrile copolymers, styrene-maleic anhydride copolymers, styrene-maleic acid ester copolymers, styrene-fumaric acid ester copolymers, styrene-divinylbenzene copolymers, styrene-alkylene glycol dimethacrylate copolymers, (meth)acrylic acid ester-butadiene-styrene copolymers (for example, MBS resin), and the like.

In this specification, (meth)acrylic acid means acrylic acid or methacrylic acid.

Copolymers of styrene-based monomers and other vinyl-based monomers include, preferably, copolymers including 50% by mass or more of structural units based on styrene-based monomers with respect to all of the structural units of the copolymer, more preferably copolymers including 70% by mass or more, and even more preferably copolymers including 80% by mass or more.

As a copolymer of a styrene-based monomer and another vinyl-based monomer, a styrene-(meth)acrylic acid copolymer and a styrene-butadiene copolymer are preferable.

Examples of the styrene-(meth)acrylic acid copolymer include a styrene-acrylic acid copolymer and a styrene-methacrylic acid copolymer.

The content of the structural unit based on (meth)acrylic acid in the polystyrene-based resin is preferably 0.5 to 6.8% by mass with respect to all the structural units forming the polystyrene-based resin, more preferably 1.0 to 5.0% by mass, and even more preferably 1.3 to 3.0% by mass. Setting the content in the numerical range described above makes it possible to exhibit excellent toughness and heat resistance.

It is possible to calculate the content of the structural unit based on (meth)acrylic acid in the polystyrene-based resin by calculation from the charged amount of styrene-(meth)acrylic acid.

The content of the structural unit based on butadiene in the polystyrene-based resin is preferably 0.5 to 6.8% by mass with respect to all the structural units forming the polystyrene-based resin, more preferably 1.0 to 5.0% by mass, and even more preferably 1.3 to 3.0% by mass. Setting the content in the numerical range described above makes it possible to exhibit excellent toughness and heat resistance.

It is possible to calculate the content of the structural unit based on butadiene in the polystyrene-based resin by calculation from the charged amount of styrene-butadiene.

In the polystyrene-based resin, the content of the styrene-(meth)acrylic acid copolymer is preferably 10% by mass or more with respect to the total mass of the polystyrene-based resin. When the content of the styrene-(meth)acrylic acid copolymer is the lower limit value described above or more, it is easy to improve the fusion property.

The content of the styrene-(meth)acrylic acid copolymer in the polystyrene-based resin is not particularly limited and may be 100% by mass with respect to the total mass of the polystyrene-based resin.

The content of the styrene-butadiene copolymer in the polystyrene-based resin is preferably 10% by mass or more with respect to the total mass of the polystyrene-based resin. When the content of the styrene-butadiene copolymer is the lower limit value described above or more, it is easy to improve the fusion property.

The content of the styrene-butadiene copolymer in the polystyrene-based resin is not particularly limited and may be 100% by mass with respect to the total mass of the polystyrene-based resin.

As polystyrene-based resins, it is possible to use commercially available polystyrene-based resins, polystyrene-based resins synthesized by suspension polymerization methods or the like, and polystyrene-based resins (virgin polystyrene) which are not recycled materials, in addition, it is possible to use recycled materials obtained by carrying out a restoring process on used polystyrene-based foam bodies, polystyrene-based resin foam molded articles (such as food packaging trays), and the like. Examples of the recycled materials include recycled materials obtained by recovering used polystyrene-based foam bodies and polystyrene-based resin foam molded articles and restoring the above using a limonene dissolution method or a heat volume reduction method.

Polyester-based resins include polyethylene terephthalate resin, polybutylene terephthalate resin, polyethylene naphthalate resin, polyethylene furanoate resin, polybutylene naphthalate resin, copolymers of terephthalic acid, ethylene glycol, and cyclohexanedimethanol, mixtures thereof, mixtures thereof with other resins, and the like. In addition, plant-derived polyethylene terephthalate resins and polyethylene furanoate resins may also be used. Polyester-based resins may be used alone as one type or in a combination of two types or more.

Furthermore, a (meth)acrylic-based resin, an acrylonitrile-styrene copolymer, an acrylonitrile-butadiene-styrene copolymer, a polyphenylene ether-based resin, or the like may be included.

The resin composition contains a foaming agent.

Examples of the foaming agent include inorganic degradable foaming agents such as sodium bicarbonate-citric acid foaming agents, ammonium carbonate, sodium bicarbonate, ammonium bicarbonate, ammonium nitrite, calcium azide, sodium azide, and sodium borohydride; azo compounds such as azodicarbonamide, azobissulformamide, azo bisisobutyronitrile, and diazoaminobenzene; nitroso compounds such as N,N'-dinitrosopentamethylenetetramine and N,N'-dimethyl-N,N'-dinitrosoterephthalamide; benzenesulfonyl hydrazide, p-toluenesulfonyl hydrazide, p,p'-oxybisbenzensulfonyl semicarbazide, p-toluenesulfonyl semicarbazide, trihydrazinotriazine, barium azodicarboxylate, and the like. Examples of gas foaming agents include air, nitrogen, carbon dioxide, propane, neopentane, methyl ether, dichloride fluoride methane, n-butane, isobutane, and the like. Here, "gas" means a gas at normal temperature (15° C. to 25° C.). On the other hand, examples of the volatile foaming agent include ether, petroleum ether, acetone, pentane, hexane, isohexane, heptane, isoheptane, benzene, toluene, and the like.

Among the foaming agents described above, n-butane and nitrogen are particularly preferable.

The content of the foaming agent in the resin composition is appropriately determined in consideration of the type, specific gravity, and the like of the foaming agent, and, for example, 0.5 to 20 parts by mass with respect to 100 parts by mass of the resin is preferable, and 0.8 to 5.5 parts by mass is more preferable.

The content of the foaming agent in the foam layer (so-called residual gas amount) is preferably 0.3 to 3.6% by mass with respect to the total mass of the foam layer, and more preferably 0.5 to 3.3% by mass.

Additives such as surfactants, bubble regulators, crosslinking agents, fillers, flame retardants, flame retardant aids, lubricants (hydrocarbons, fatty acids, fatty acid amides, esters, alcohols, metal soaps, silicone oils, and waxes such as low molecular weight polyethylene, and the like), spreading agents (liquid paraffin, polyethylene glycol, polybutene, and the like), colorants, heat stabilizers, ultraviolet absorbers, and anti-oxidants may be added to the resin composition.

Examples of bubble regulators include inorganic powders such as talc and silica; acidic salts of polyvalent carboxylic acids; reaction mixtures of polyvalent carboxylic acids and sodium carbonate or sodium bicarbonate, and the like. Among the above, a reaction mixture is preferable from the point of maintaining a closed cell ratio and easily improving moldability.

The bubble regulator may be used alone as one type or in a combination of two types or more.

The added amount of the bubble regulator is preferably 0.01 to 1.0 part by mass with respect to 100 parts by mass of the resin.

The closed cell ratio of the foam layer is 70% or more, preferably 75% or more, and more preferably 80% or more. The upper limit value is not particularly limited and, for example, 99% or less is preferable. Specifically, the closed cell ratio of the foam layer is preferably 70 to 99%, more preferably 75 to 99%, and even more preferably 80 to 99%.

When the closed cell ratio of the foam layer is in the numerical range described above, the impact resistance is excellent and the thermoformability is more easily improved.

The closed cell ratio of the foam layer is measured by the method described in JIS K7138: 2006 "Hard foamed plastics—How to determine open cell ratios and closed cell ratios".

A thickness T1 of the foam layer is 2.0 to 6.0 mm, and preferably 2.5 to 5.0 mm. When the thickness of the foam layer is the lower limit value described above or more, the shape retaining property is excellent. It is possible to further improve the moldability when the thickness of a foam layer is the upper limit value described above or less.

In this specification, the thickness is a value obtained by measuring 20 points at equal intervals in the width direction (TD direction) of the measurement object using a macro gauge and using the arithmetic average value thereof.

The basis weight of the foam layer is preferably 250 to 700 $g/m^2$, and more preferably 400 to 600 $g/m^2$. When the basis weight of the foam layer is in the numerical range described above, the handleability is excellent.

It is possible to measure the basis weight by the following method.

Excluding 20 mm at both ends in the width direction of the foam layer, 10 pieces of 10 cm×10 cm are cut out at equal intervals in the width direction, and the mass (g) of each piece is measured up to 0.001 g units. A value obtained by converting the average value of the mass (g) of each piece into a mass per 1 $m^2$ is set as the basis weight ($g/m^2$) of the foam layer.

The density of the foam layer is preferably 90 to 350 Kg/n, and more preferably 100 to 300 $Kg/m^3$. When the density of the foam layer is in the numerical range described above, the handleability is excellent.

<Method for Manufacturing Foam Sheet>

The foam sheet forming the foam layer is manufactured according to a manufacturing method known in the related art.

Examples of the method for manufacturing a foam sheet include a method of preparing a resin composition, extruding the resin composition into a sheet shape, and carrying out foaming (primary foaming) (extrusion foaming method).

A description will be given of an example of a method for manufacturing a foam sheet, using FIG. 2.

Figure 2:
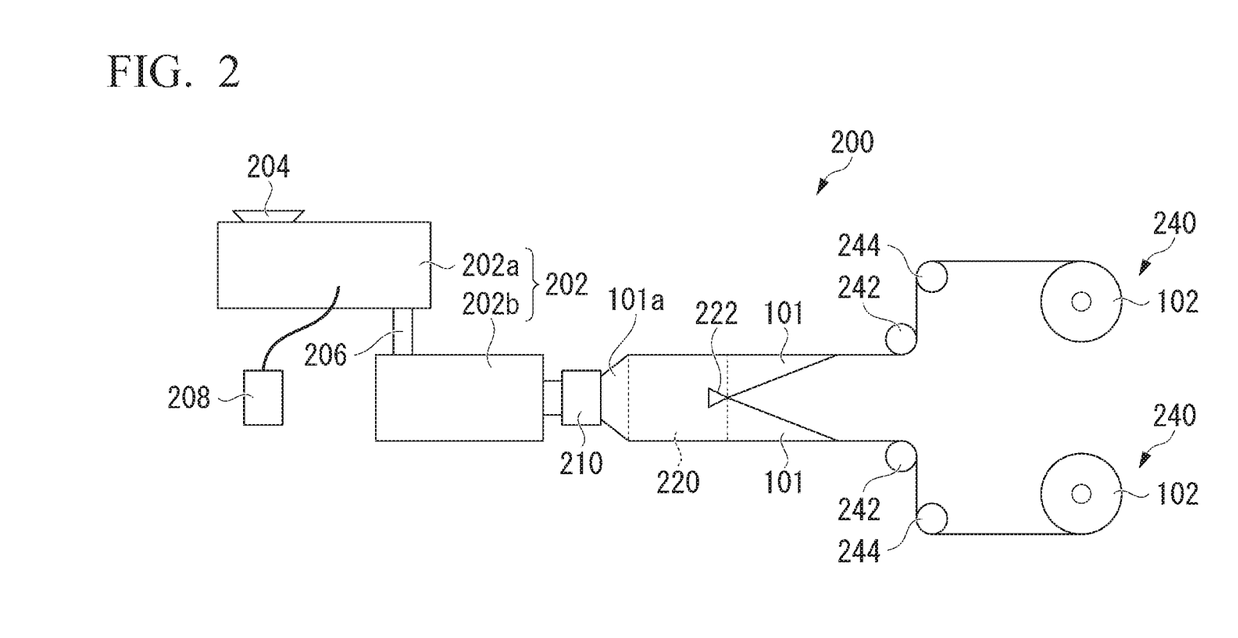
FIG. 2 is a schematic view showing an example of a manufacturing apparatus for a foam sheet.

A foam sheet manufacturing apparatus 200 in FIG. 2 is an apparatus for obtaining a foam sheet by inflation molding and is provided with an extruder 202, a foaming agent supply source 208, a circular die 210, a mandrel 220, and two winders 240.

The extruder 202 is a so-called tandem extruder and has a configuration in which an extruder A 202a and an extruder B 202b are connected by a pipe 206. A first extruder A 202a is provided with a hopper 204 and the foaming agent supply source 208 is connected to the extruder A 202a.

The circular die 210 is connected to the extruder B 202b and the mandrel 220 is provided downstream of the circular die 210. The mandrel 220 is provided with a cutter 222.

First, the raw materials forming the resin composition are charged from the hopper 204 into the extruder A 202a. The raw materials charged from the hopper 204 are the resin forming the foam sheet, an additive blended as necessary, and the like.

In the extruder A 202a, the raw materials are mixed while heating to an arbitrary temperature to make a resin melt, a foaming agent is supplied from the foaming agent supply source 208 to the extruder A 202a, and the foaming agent is mixed with the resin melt to obtain a resin composition.

The heating temperature is appropriately determined in a range in which the resin is melted and the additive is not denatured in consideration of the type of the resin or the like.

The resin composition is supplied from the extruder A 202a to the extruder B 202b via the pipe 206, further mixed, cooled to an arbitrary temperature, and then supplied to the circular die 210. The temperature of the resin composition at the time of extrusion from the circular die 210 is 140 to 190° C., and more preferably 150 to 190° C.

The resin composition is extruded from the circular die 210 and the foaming agent is foamed to make a cylindrical foam sheet 101a. Cooling air 211 is blown onto the foam sheet 101a extruded from the circular die 210 and then the foam sheet 101a is supplied to the mandrel 220. It is possible to adjust the cooling rate of the foam sheet 101a through a combination of the temperature, amount, and blowing position of the cooling air 211.

The cylindrical foam sheet 101a is made to have an arbitrary temperature on the mandrel 220, sized, and cut into two sheets by the cutter 222 to form the foam sheet 101. The foam sheets 101 are each wound around guide rolls 242 and guide rolls 244 and taken in by the winders 240 to form a foam sheet roll 102.

The foaming multiple of the foam sheet is, for example, 2 to 20 times.

Here, the foam sheet may be manufactured by a method other than inflation molding.

<First Non-Foam Layer>

The first non-foam layer includes a non-cross-linked olefin-based elastomer.

Here, in this specification. "non-foam" represents a state in which the raw material resin is not foamed, and refers to a case where the foaming multiple is 1.0 times.

In addition, in the present specification, "non-cross-linked" means that the gel fraction is 3.0% by mass or less, and more preferably 1.0% by mass or less. The gel fraction is a value measured as follows.

A mass W1 of the resin is measured. Next, the resin is heated at reflux for 3 hours in 80 ml of boiling xylene. Next, residue in the xylene is filtered using a 200-mesh wire mesh, the residue remaining on the wire mesh is washed with new xylene, then naturally dried for one day, then dried at 120° C. for 2 hours in a dryer, and a mass W2 of the residue remaining on the wire mesh is measured. Subsequently, the gel fraction of the resin is calculated based on Formula (1).

$$\text{Gel fraction (\% by mass)} = 100 \times W2/W1 \qquad (1)$$

The non-cross-linked olefin-based elastomer is preferably a propylene homopolymer or a copolymer of propylene and one type or more of α-olefin selected from the group consisting of ethylene, 1-butene, 1-pentene, 1-hexene, 1-octene, and 4-methyl-1-pentene, or the like.

The content of the non-cross-linked olefin-based elastomer is preferably 60% by mass or more with respect to 100% by mass of the resin forming the first non-foam layer, more preferably 80% by mass or more, and even more preferably 100% by mass. Specifically, the content is preferably 60 to 100% by mass, and more preferably 80 to 100% by mass.

As a resin other than the non-cross-linked olefin-based elastomer, the first non-foam layer may include the polyolefin-based resin, polystyrene-based resin, polyester-based resin, and the like described in <Foam Layer> above.

The maximum static friction coefficient of the first non-foam layer determined by JIS K7125 is preferably 2.0 or more, more preferably 2.5 or more, and even more preferably 3.0 to 4.5. When the maximum static friction coefficient of the first non-foam layer is in the range described above, it is possible to make it hard for slipping to occur.

As the counterpart material for measuring the static friction coefficient, it is preferable to use an aluminum material with a mirror finish in order to determine the slipperiness.

The basis weight (a) of the first non-foam layer is preferably 100 to 400 $g/m^2$, and more preferably 130 to 300 $g/m^2$. When the basis weight (a) of the first non-foam layer is in the numerical range described above, the handleability is excellent.

It is possible to measure the basis weight by the following method.

Excluding 20 mm at both ends in the width direction of the first non-foam layer, 10 pieces of 10 cm×10 cm are cut out at equal intervals in the width direction and the mass (g) of each piece is measured up to 0.001 g units. A value obtained by converting the average value of the mass (g) of each piece into a mass per 1 $m^2$ is set as a basis weight (a) ($g/m^2$) of the first non-foam layer.

A thickness T2 of the first non-foam layer is appropriately determined according to the required strength and the like and, for example, is preferably 0.1 to 0.3 mm, and more preferably 0.12 to 0.2 mm. When the thickness T2 is the lower limit value described above or more, sufficient strength is easily obtained. When the thickness T2 described above is the upper limit value described above or less, molding processing is easy.

The Duro A hardness of the first non-foam layer determined by JIS K6253-3 is preferably 70 or less, and more preferably 30 to 50. When the Duro A hardness is in the range described above, the grip property is excellent.

The fracture point elongation percentage of the first non-foam layer determined by JIS K6251 is preferably 900% or more, and more preferably 1000 to 1500%. When the fracture point elongation percentage is in the above ranges, molding followability is excellent.

The first non-foam layer may include an additive. Examples of the additives include flame retardants, flame retardant aids, lubricants, spreading agents, colorants, antistatic agents, anti-fogging agents, anti-blocking agents, antioxidants, light stabilizers, crystal nucleating agents, surfactants, fillers, and the like.

In a case where the additive is included in the first non-foam layer, the content thereof is preferably more than 0 parts by mass and 30 parts by mass or less with respect to 100 parts by mass of the resin.

<Second Non-Foam Layer>

The second non-foam layer includes a resin. As the resin forming the non-foam layer, it is possible to use the same resins as described above as the resin forming the <Foam Layer>.

Preferably, the second non-foam layer includes a filler. By including the filler, the strength is more easily improved.

The filler is preferably an inorganic filler and examples thereof include plate-like mineral particles such as talc, kaolin, calcined kaolin, bentonite, and mica group minerals (sericite, muscovite, phlogopite, and biotite). Of these, talc is preferable.

The content of the filler is preferably 5 to 50% by mass with respect to the total mass of the second non-foam layer, and more preferably 10 to 40% by mass.

When the content of the inorganic filler is within the numerical range described above, the strength is excellent.

The average particle size of the filler is preferably 1 to 50 μm, more preferably 3 to 30 μm. When the average particle size of the filler is within the numerical range described above, the strength is excellent.

In this specification, it is possible to measure the average particle size by a laser diffraction method.

The second non-foam layer has a maximum static friction coefficient determined by JIS K7125 of 1.0 or less, and preferably 0.1 to 0.5. When the maximum static friction coefficient of the second non-foam layer is within the range described above, it is possible to reduce the feeling of stickiness and the feeling of snagging.

In order to keep the maximum static friction coefficient in the range described above, the amount of the non-crosslinked olefin-based elastomer is preferably 10% or less, and more preferably 5% or less.

The basis weight (b) of the second non-foam layer is preferably 100 to 400 g/m$^2$, and more preferably 130 to 300 g/m$^2$. When the basis weight (b) of the second non-foam layer is in the numerical range described above, the handleability is excellent.

It is possible to measure the basis weight by the following method.

Excluding 20 mm at both ends in the width direction of the second non-foam layer, 10 pieces of 10 cm×10 cm are cut out at equal intervals in the width direction and the mass (g) of each piece is measured up to 0.001 g units. A value obtained by converting the average value of the mass (g) of each piece into a mass per 1 m$^2$ is set as a basis weight (b) (g/m$^2$) of the second non-foam layer.

A thickness T3 of the second non-foam layer is appropriately determined according to the required strength or the like and, for example, is preferably 0.1 to 0.3 mm, and more preferably 0.12 to 0.2 mm. When the thickness T3 is the lower limit value described above or more, it is easy to obtain sufficient strength. When the thickness T3 is the upper limit value described above or less, the molding processing is easy.

The piercing strength of the second non-foam layer determined by JIS K7171 is preferably 20 N or more, more preferably 22 to 50 N, and even more preferably 25 to 40 N. When the piercing strength is within the range described above, the strength is excellent.

The second non-foam layer may include an additive. Examples of the additives include flame retardants, flame retardant aids, lubricants, spreading agents, colorants, anti-static agents, anti-fogging agents, anti-blocking agents, anti-oxidants, light stabilizers, crystal nucleating agents, surfactants, and the like.

In a case where the additive is included in the second non-foam layer, the content thereof is preferably more than 0 parts by mass and 30 parts by mass or less with respect to 100 parts by mass of the resin.

In the laminated foam sheet, a ratio represented by [basis weight (a) of first non-foam layer]/[basis weight (b) of second non-foam layer] (also referred to below as a/b ratio) is 0.5 to 2.0, and preferably 0.6 to 1.7. When the a/b ratio is in the range described above, it is easy to improve the curl suppressing property.

In the laminated foam sheet, the difference between the melting point of the resin forming the first non-foam layer and the melting point of the resin forming the second non-foam layer is preferably within 10° C., and more preferably 7° C. or lower. When the difference in the melting points is within the range described above, the curl suppressing property is more easily improved.

In a case where the first non-foam layer and the second non-foam layer include a plurality of resins, the melting points of the respective resins are measured, and the average value of the melting points is calculated from the content ratio of each resin, and the results are set as the melting points of the first non-foam layer and the second non-foam layer.

For example, in a case where the first non-foam layer includes 100 g of the resin having a melting point of 140° C. and 50 g of the resin having a melting point of 160° C., the average value of the melting points is calculated as follows.

$$140° C.\times[100 \text{ g}/(100 \text{ g}+50 \text{ g})]+160° C.\times[50 \text{ g}/(100 \text{ g}+50 \text{ g})]=146.7° C.$$

The melting point of the resin is measured by the method described in JIS K7121: 1987 "Method for Measuring Transition Temperature of Plastic".

The thickness T of the laminated foam sheet 1 is appropriately determined in consideration of the application or the like and, for example, is preferably 2.0 to 6.5 mm, and more preferably 2.5 to 5.5 mm. When the thickness of the laminated foam sheet is the lower limit value described above or more, it is easy to obtain sufficient strength. When the thickness is the upper limit value described above or less, the molding processing is easy.

The basis weight of the laminated foam sheet is preferably 700 to 1500 g/m$^2$, and more preferably 750 to 1300 g/m$^2$. When the basis weight of the laminated foam sheet is in the numerical range described above, the handleability is excellent.

It is possible to measure the basis weight by the following method.

Excluding 20 mm at both ends in the width direction of the laminated foam sheet, 10 pieces of 10 cm×10 cm are cut out at equal intervals in the width direction, and the mass (g) of each piece is measured up to 0.001 g units. The value obtained by converting the average value of the mass (g) of each piece into the mass per 1 m$^2$ is set as the basis weight (g/m$^2$) of the laminated foam sheet.

The density of the laminated foam sheet is preferably 100 to 400 Kg/m$^3$, and more preferably 150 to 350 Kg/m$^3$. When the density of the laminated foam sheet is in the numerical range described above, the handleability is excellent.

<Method for Manufacturing Laminated Foam Sheet>

A description will be given of an example of a method for manufacturing the laminated foam sheet 1.

The manufacturing method of the laminated foam sheet 1 is preferably provided with, for example, a foam sheet forming step for obtaining a foam sheet, a first laminating step of fusing a resin forming a first non-foam layer to one surface of the foam sheet by extrusion lamination, and a second laminating step of fusing a resin forming the second non-foam layer to the other surface of the foam sheet by extrusion lamination.

The foam sheet forming step is the same as the method for manufacturing a foam sheet described above.

The first laminating step is a step of fusing a resin forming the first non-foam layer to one surface of the foam sheet by extrusion lamination.

Figure 3:
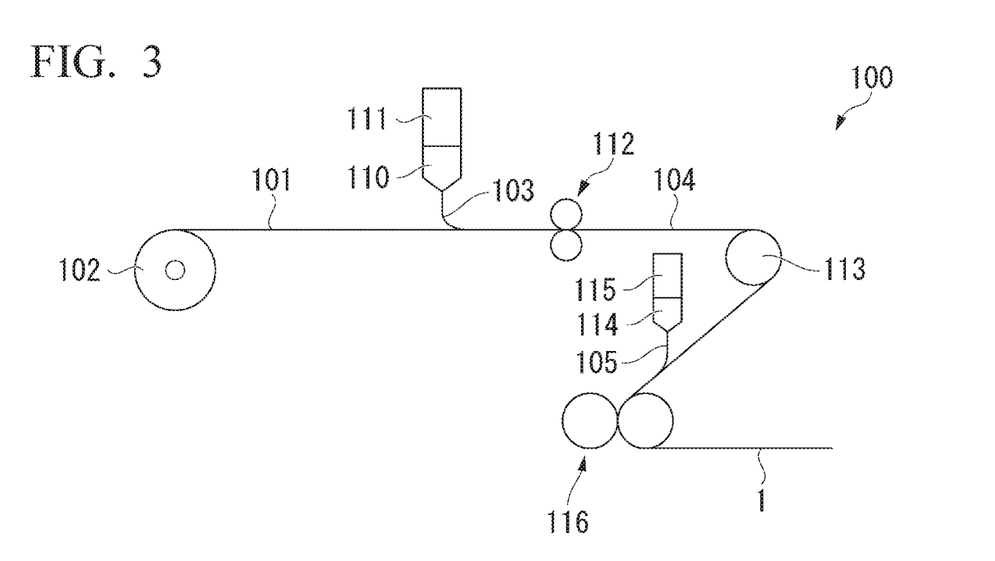
FIG. 3 is a schematic view showing an example of a manufacturing apparatus for a laminated foam sheet of the present invention.

A description will be given below of an example of the first laminating step and the second laminating step using FIG. 3.

The foam sheet 101 is fed from the foam sheet roll 102, and a melted resin 103 is supplied to one surface of the foam sheet 101 from a die 110 by a first extruder 111. Thereafter, pressing and fusing is carried out by a pair of cooling rolls 112.

In this manner, a laminated foam sheet 104 formed of two layers provided with the foam layer 10 and the first non-foam layer 20 is obtained. The heating temperature in the laminating step is appropriately determined according to the material and the like of each layer.

The second laminating step is a step of fusing a resin forming the second non-foam layer to the other surface of the foam sheet by extrusion lamination.

The laminated foam sheet 104 formed of two layers obtained in the first laminating step is wound around a roll 113 and a melted resin 105 is supplied from a die 114 to the other surface of the foam sheet by a second extruder 115. Thereafter, pressing and fusing is carried out by a pair of cooling rolls 116.

In this manner, the laminated foam sheet 1 formed of three layers provided with the foam layer 10, the first non-foam layer 20, and the second non-foam layer 30 is obtained.

The two laminating steps may be performed in the order of the second laminating step and the first laminating step. In addition, the laminated foam sheet of the present invention is not limited to the manufacturing method described above (extrusion lamination method) and the foam layer and the non-foam layers may be laminated by coextrusion or a thermal lamination method.

<Molded Article>

It is possible to obtain the molded article of the present invention by molding a laminated foam sheet.

Examples of a method of molding the laminated foam sheet include a method in which the laminated foam sheet is heated to an arbitrary temperature for secondary foaming and then the laminated foam sheet is interposed between a male mold and a female mold with an arbitrary shape to carry out molding.

The first non-foam layer is preferably molded so as to have a surface which faces downward in the vertical direction when the molded article is used.

It is possible to use the molded article of the present invention for a floor mat for a vehicle, a luggage tray for a vehicle, and an undercover for a vehicle.

The floor mat for a vehicle is detachably arranged on the floor of the vehicle, captures dirt from earth, sand, and the like brought in by a passenger from outside the vehicle, and is washed outside the cabin so as to be repeatedly used. In the floor mat for a vehicle, the first non-foam layer is preferably arranged so as to face downward in the vertical direction when the floor mat is used. Due to this, it is possible to prevent the floor mat for a vehicle from shifting from a predetermined position.

Figure 4:
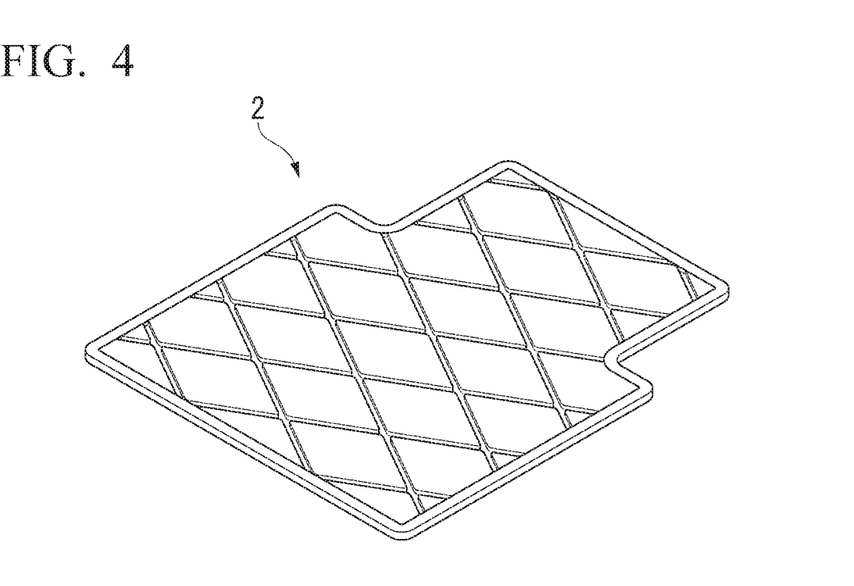
FIG. 4 is a schematic view showing an example of a floor mat for a vehicle of the present invention.

FIG. 4 is a schematic view showing an example of the floor mat of the vehicle of the present invention. The floor mat for a vehicle 2 of FIG. 4 has notches so as to be able to be arranged at the foot of a seat in front of the vehicle and has an uneven structure on the surface thereof to prevent slippage. It is sufficient if the notches are formed according to the shape of the vehicle. The uneven structure may be any shape and may or may not be present.

The undercover for a vehicle covers and protects the lower part of the vehicle body. In the undercover for a vehicle, the first non-foam layer is preferably arranged so as to face downward in the vertical direction when the undercover is used. Due to this, it is possible to protect the vehicle from earth, sand, or the like thrown up from the ground to the vehicle while the vehicle is running.

Figure 5:
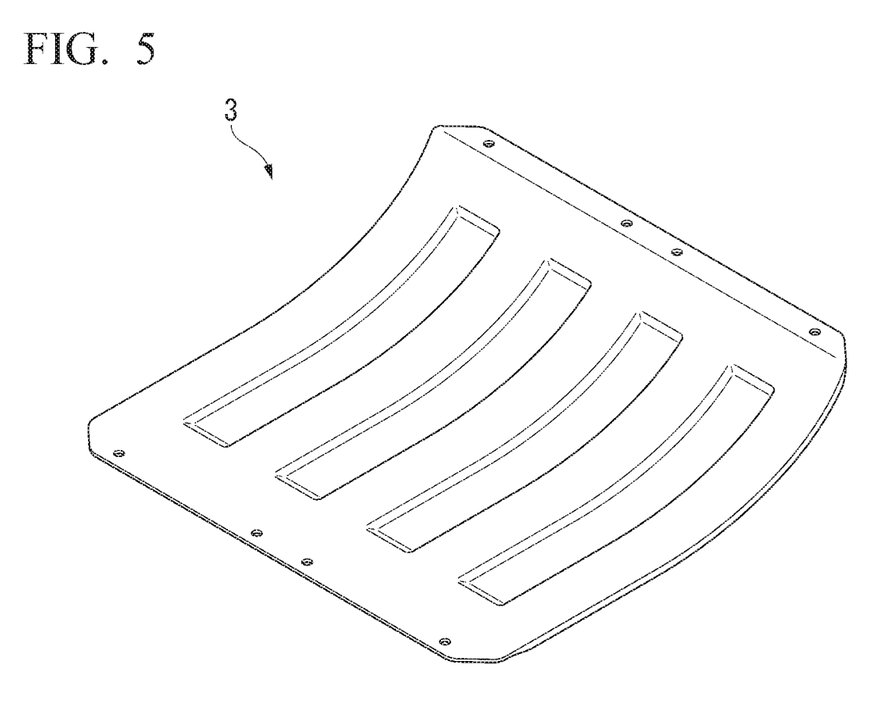
FIG. 5 is a schematic view showing an example of an undercover for a vehicle of the present invention.

FIG. 5 is a schematic view illustrating an example of the undercover of the vehicle of the present invention. An undercover 3 for a vehicle in FIG. 5 has an uneven structure which makes it possible to reduce air resistance and improve fuel efficiency. The uneven structure may be any shape and may or may not be present.

The luggage tray for a vehicle is a storage tray installed at the bottom of the vehicle such as a trunk room.

In the luggage tray for a vehicle, the first non-foam layer is preferably arranged so as to face downward in the vertical direction when the luggage tray for a vehicle is used. Due to this, it is possible to prevent the luggage tray for a vehicle from shifting from a predetermined position.

Figure 6:
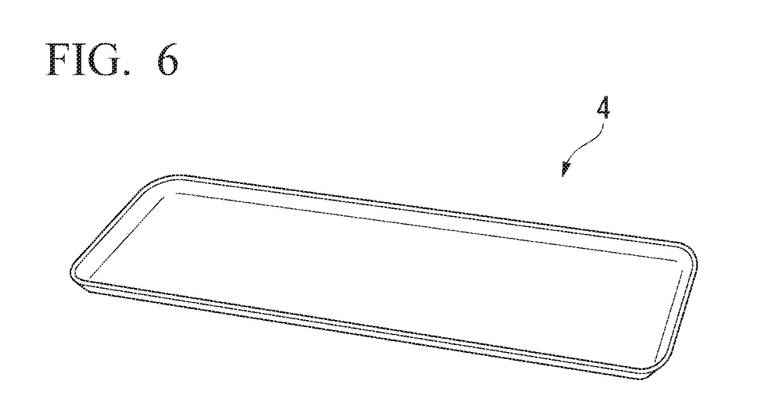
FIG. 6 is a schematic view showing an example of a luggage tray for a vehicle of the present invention.

FIG. 6 is a schematic view showing an example of a luggage tray for a vehicle of the present invention. A luggage tray 4 for a vehicle shown in FIG. 6 is rectangular in plan view, but may have any shape.

Figure 7:
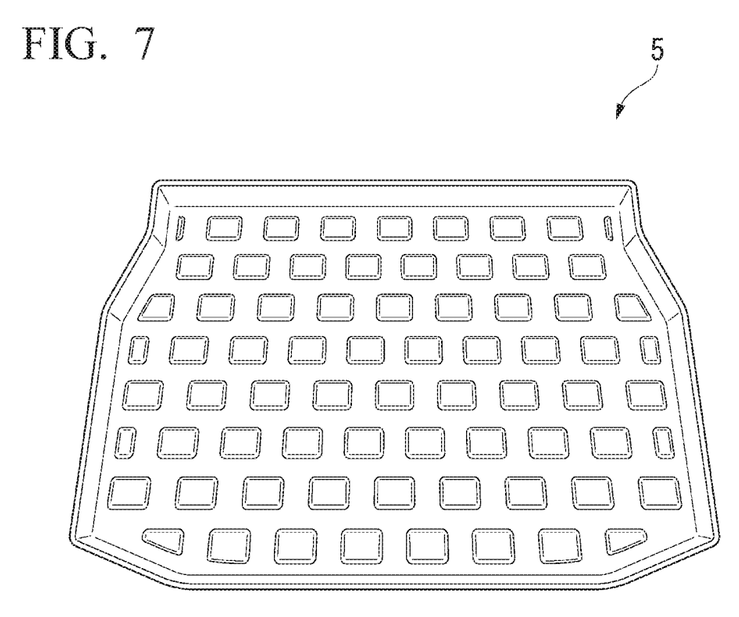
FIG. 7 is a schematic view showing another example of a luggage tray for a vehicle of the present invention.

FIG. 7 is a schematic view showing another example of the luggage tray for a vehicle according to the present invention. A luggage tray 5 for a vehicle shown in FIG. 7 has notches so as to be able to be arranged in a trunk and has an uneven structure on the surface to prevent slippage. It is sufficient if the notches are formed according to the shape of the vehicle. The uneven structure may be any shape and may or may not be present.

EXAMPLES

A more detailed description will be given below of the present invention through Examples and Comparative Examples, but the present invention is not limited to the following Examples.

Example 1

A polymer component was prepared including a ratio of 45% by mass of product name "WB140HMS" (melt tension: 23 cN, melt mass flow rate (MFR): 1.7 g/10 min) manufactured by Borealis AG, as a polypropylene-based resin for a foam layer, 50% by mass of product name "BC6C" (MFR: 2.5 g/10 min) manufactured by Japan Polypropylene Corporation, as block polypropylene, and 5% by mass of product name "Q-100F" manufactured by Lyondell Basell, as a polyolefin-based thermoplastic elastomer (TPO). A resin composition was obtained by blending a sodium bicarbonate-citric acid foaming agent (master batch manufactured by Dainichiseika Color & Chemicals Mfg Co., Ltd., product name "Finecell Master PO410K") at 0.2 parts by mass with respect to 100 parts by mass of the obtained polymer component.

A tandem extruder was prepared by connecting an extruder B having a diameter of 115 mm to the tip of an extruder A having a diameter of 90 mm. The resin composition was supplied to the extruder A of the tandem extruder, melt-kneaded at approximately 200 to 210° C., and then 1.0 part by mass of butane (n-butane/isobutane=65/35 (mass ratio)) was press-fitted in the extruder A as a foaming agent and further melt-kneading was carried out. After that, the resin composition was cooled to 175° C., supplied to a cyclic die connected to the tip of the extruder B, and extrusion-foamed in a cylindrical shape with an extrusion rate of 150 Kg/hour.

The obtained cylindrical foam body was cooled by blowing air onto the inner surface thereof. Thereafter, the inner surface was solidified over the cooling mandrel plug and cool air was also blown onto the outer surface of the plug to carry out cooling and solidification. The cooled and solidified cylindrical foam body was cut open by cutting in the extrusion direction and wound into a roll as a continuous sheet. As a result, a foam sheet having a basis weight of 540 g/m$^2$ and a thickness of 3.0 mm was obtained.

As a resin forming the first non-foam layer, a resin formed of 100% by mass of a non-cross-linked olefin-based elastomer (product name "3400B", manufactured by JSR Corporation, MFR=3, Duro A hardness: 33) was supplied to a first extruder and extruded at a discharge rate of 20 kg/hour from a T-die attached to the tip of the first extruder to obtain a first non-foam layer sheet in a molten state. The obtained first non-foam layer sheet in a molten state was laminated on one surface of the foam sheet and integrated therewith to obtain a laminated foam sheet formed of two layers.

Subsequently, a mixture obtained by mixing 43 parts by mass of a talpet 70P (manufactured by Nitto Funka Kogyo K.K.) containing 70% by mass of an inorganic filler with 100 parts by mass of a polypropylene-based resin (manufactured by Japan Polypropylene Corporation, product name "BC6C") was supplied to the second extruder, and extruded at a discharge rate of 20 kg/hour from a T die attached to the tip of the second extruder to obtain a second non-foam layer sheet in a molten state. The obtained second non-foam layer sheet in a molten state was laminated on the other surface of the foam sheet and integrated to obtain a laminated foam sheet formed of three layers.

Example 2

A laminated foam sheet was obtained in the same manner as in Example 1 except that the discharge amount of the second extruder was set to 200% of the discharge amount of Example 1 and the discharge amount of the first extruder was set to 119% of the discharge amount of Example 1.

Example 3

A laminated foam sheet was obtained in the same manner as in Example 1 except that the resin of the first extruder was changed to a non-cross-linked olefin-based elastomer (product name "3700B", manufactured by JSR Corporation, MFR=1, Duro A hardness: 65).

Example 4

A laminated foam sheet was obtained in the same manner as in Example 1 except that the foaming agent of the foam sheet of Example 1 was changed from 1.0 part by mass of butane to 1.5 parts by mass of butane.

Example 5

A laminated foam sheet was obtained in the same manner as in Example 1 except that the resin of the second extruder was changed to polypropylene resin E111G (made of prime polymer, MFR=0.5, homo) and an inorganic filler was not used.

Example 6

A laminated foam sheet was obtained in the same manner as in Example 2, except that an inorganic filler was not used.

Comparative Example 1

A laminated foam sheet formed of two layers was obtained in the same manner as in Example 1 except that the resin of the second extruder was a polypropylene-based resin "BC6C" (Block, manufactured by Japan Polypropylene Corporation), an inorganic filler was not used, the discharge rate was 60%, and the first extruder was not operated.

Comparative Example 2

A laminated foam sheet formed of two layers was obtained in the same manner as in Example 1 except that the resin of the second extruder was kept as in Example 1 and the first extruder was not operated.

Comparative Example 3

A laminated foam sheet was obtained in the same manner as in Example 1 except that the resin of the second extruder was changed to a cross-linked olefin elastomer 1301B (manufactured by JSR Corporation, MFR=1, hardness Duro A=37).

Comparative Example 4

A laminated foam sheet was obtained in the same manner as in Example 1 except that the resin of the second extruder was changed to a cross-linked olefin elastomer 1703B (manufactured by JSR Corporation, MFR=2, hardness Duro A=73).

Comparative Example 5

A laminated foam sheet was obtained in the same manner as in Example 1 except that the resins of the first extruder and the second extruder were changed to a non-cross-linked olefin-based elastomer (product name "3400B", manufactured by JSR Corporation, Duro A hardness: 33), an inorganic filler was not used, and the discharge amount of the first extruder was set to 90%.

Comparative Example 6

A laminated foam sheet was obtained in the same manner as in Example 1 except that the discharge amount of the second extruder was set to 47% of the discharge amount of Example 1 and the discharge amount of the first extruder was set to 119% of the discharge amount of Example 1.

Comparative Example 7

A laminated foam sheet was obtained in the same manner as in Example 1 except that the discharge amount of the first extruder was set to 119% of the discharge amount of Example 1, the second extruder resin was changed to 60% by mass of a polypropylene-based resin "BC6C" (manufactured by Japan Polypropylene Corporation, block) and 40% by mass of a polyethylene resin "LF580" (MFR=4, melting point=116° C., manufactured by Japan Polyethylene Co., Ltd.), the discharge rate was 43%, and an inorganic filler was not used.

Comparative Example 8

Butane (normal butane:isobutane=65:35 (mass ratio)) as a foaming agent was press-fitted in the extruder A of the foam sheet so as to be 0.5 parts by mass with respect to 100 parts by mass of the polymer component, and further melt-kneading was carried out. After that, the result was cooled to approximately 185° C., and the take-up speed was appropriately adjusted at a discharge rate of 125 Kg/h to obtain a foam sheet having a thickness of 1.2 mm and a basis weight of 250 g/m$^2$.

Thereafter, a non-foam layer was laminated in the same manner as in Example 1 to obtain a laminated foam sheet.

Comparative Example 9

Butane (normal butane:isobutane=65:35 (mass ratio)) as a foaming agent was press-fitted in the extruder A of the foam sheet so as to be 1.1 parts by mass with respect to 100 parts by mass of the polymer component, and further melt-kneading was carried out. After that, the result was cooled to approximately 185° C., and the take-up speed was appropriately adjusted at a discharge rate of 125 Kg/h to obtain a foam sheet having a thickness of 2.3 mm and a basis weight of 350 g/m².

Thereafter, a non-foam layer was laminated in the same manner as in Example 1 to obtain a laminated foam sheet.

<Basis Weight>

Excluding 20 mm at both ends in the width direction of the foam sheet, the first non-foam layer sheet, the second non-foam layer sheet, or the laminated foam sheet, 10 pieces of 10 cm×10 cm were cut out at equal intervals in the width direction, and the mass (g) of each piece was measured up to 0.001 g units. The value obtained by converting the average value of the mass (g) of each piece into the mass per 1 m² was set as the basis weight M (g/m²).

<Thickness>

Excluding 20 mm at both ends in the width direction of the foam sheet, the first non-foam layer sheet, the second non-foam layer sheet, or the laminated foam sheet, 21 points were measured at intervals of 50 mm in the width direction. At these measurement points, the thickness was measured up to a minimum unit of 0.01 mm using a dial thickness gauge SM-112 (manufactured by Teclock). The average value of the measured values was set as the thickness T (mm).

<Density>

From the thickness T (mm) and the basis weight M (g/m²), the density $\rho$ (Kg/m³) was determined using the following equation (2).

$$\rho = M/T \quad (2)$$

<Closed Cell Ratio>

The closed cell ratio was measured by the method described in JIS K7138:2006 "Hard foamed plastics—How to determine open cell ratios and closed cell ratios".

<Melting Point>

The melting point was measured by the method described in JIS K7121: 1987 "Method for Measuring Transition Temperature of Plastic".

<Maximum Static Friction Coefficient>

The maximum static friction coefficient was measured according to JIS K7125.

<Piercing Strength>

The piercing strength was measured using a Tensilon universal testing machine according to JIS K7171.

Using a pin vise TP-1 (diameter 1φ, tip SR 0.5 mm) (manufactured by Imada Co., Ltd.) as a piercing tip measuring jig, measurement was carried out at N=5 to obtain an average value.

<Curl Suppressing Property>

Regarding curling, in a laminated foam sheet having an A4 size (297 mm×210 mm), one end in the width direction was set as a zero point and the height of the other end was measured. The lower the height, the better the curl suppressing property.

TABLE 1

| | Foam layer | | | First Non-Foam Layer | | | | Second Non-Foam Layer | | | | Laminated Foam Sheet Whole Body | | |
|---|---|---|---|---|---|---|---|---|---|---|---|---|---|---|
| | Thickness T1 mm | Basic Weight g/m² | Density kg/m³ | Closed Cell Ratio % | Resin | Thickness T2 mm | Basic Weight a g/m² | Melting Point ° C. | Resin | Thickness T3 mm | Basic Weight b g/m² | Melting Point ° C. | Thickness mm | Basic Weight g/m² | Density kg/m³ |
| Example 1 | 3 | 540 | 180 | 75 | 3400B | 0.16 | 144 | 156 | BC6C + filler | 0.15 | 150 | 165 | 3.3 | 834 | 253 |
| Example 2 | 3 | 540 | 180 | 75 | 3400B | 0.19 | 171 | 156 | BC6C + filler | 0.30 | 300 | 165 | 3.5 | 1011 | 289 |
| Example 3 | 3 | 540 | 180 | 75 | 3700B | 0.16 | 144 | 158 | BC6C + filler | 0.15 | 150 | 165 | 3.3 | 834 | 253 |
| Example 4 | 5 | 560 | 112 | 75 | 3400B | 0.16 | 144 | 156 | BC6C + filler | 0.15 | 150 | 165 | 5.3 | 854 | 161 |
| Example 5 | 3 | 540 | 180 | 75 | 3400B | 0.16 | 144 | 156 | E111G | 0.15 | 135 | 165 | 3.3 | 819 | 248 |
| Example 6 | 3 | 540 | 180 | 75 | 3400B | 0.19 | 171 | 156 | BC6C | 0.15 | 135 | 165 | 3.3 | 846 | 256 |
| Comparative Example 1 | 3 | 540 | 180 | 75 | — | — | — | — | BC6C | 0.10 | 90 | 165 | 3.1 | 626 | 202 |
| Comparative Example 2 | 3 | 540 | 180 | 75 | — | — | — | — | BC6C + filler | 0.15 | 150 | 165 | 3.2 | 690 | 216 |
| Comparative Example 3 | 3 | 540 | 180 | 75 | 1301B | 0.16 | 144 | 158 | BC6C + filler | 0.15 | 150 | 165 | 3.3 | 834 | 253 |
| Comparative Example 4 | 3 | 540 | 180 | 75 | 1703B | 0.16 | 144 | 158 | BC6C + filler | 0.15 | 150 | 165 | 3.3 | 834 | 253 |
| Comparative Example 5 | 3 | 540 | 180 | 75 | 3400B | 0.16 | 144 | 156 | 3400B | 0.15 | 135 | 158 | 3.3 | 819 | 248 |

TABLE 1-continued

| | Foam layer | | | | First Non-Foam Layer | | | | Second Non-Foam Layer | | | | Laminated Foam Sheet Whole Body | | |
|---|---|---|---|---|---|---|---|---|---|---|---|---|---|---|---|
| | Thickness T1 mm | Basic Weight g/m² | Density kg/m³ | Closed Cell Ratio % | Resin | Thickness T2 mm | Basic Weight a g/m² | Melting Point °C. | Resin | Thickness T3 mm | Basic Weight b g/m² | Melting Point °C. | Thickness mm | Basic Weight g/m² | Density kg/m³ |
| Comparative Example 6 | 3 | 540 | 180 | 75 | 3400B | 0.19 | 171 | 156 | BC6C + filler | 0.07 | 70 | 165 | 3.3 | 781 | 237 |
| Comparative Example 7 | 3 | 540 | 180 | 75 | 3400B | 0.19 | 171 | 156 | BC6C + LF580 | 0.07 | 64 | 145 | 3.3 | 775 | 235 |
| Comparative Example 8 | 1.2 | 250 | 208 | 75 | 3400B | 0.16 | 144 | 156 | BC6C + filler | 0.15 | 150 | 165 | 1.5 | 544 | 363 |
| Comparative Example 9 | 2.3 | 350 | 152 | 25 | 3400B | 0.16 | 144 | 156 | BC6C + filler | 0.15 | 150 | 165 | 2.6 | 644 | 248 |

TABLE 2

| | Properties of Laminated Foam Sheet | | | | | |
|---|---|---|---|---|---|---|
| | Static friction coefficient (first non-foam layer) | Static friction coefficient (second non-foam layer) | a/b ratio | Difference in melting point °C. | Piercing strength (first non-foam layer) N | Piercing strength (second non-foam layer) N | Curl mm |
| Example 1 | 3.11 | 0.31 | 1.0 | 9.0 | 16.3 | 28.6 | 15 |
| Example 2 | 2.88 | 0.31 | 0.6 | 9.0 | 17.8 | 29.5 | 35 |
| Example 3 | 2.56 | 0.31 | 1.0 | 7.0 | 18.3 | 27.9 | 10 |
| Example 4 | 2.89 | 0.31 | 1.0 | 9.0 | 16.6 | 28.1 | 5 |
| Example 5 | 2.91 | 0.35 | 1.1 | 9.0 | 16.3 | 25.1 | 15 |
| Example 6 | 2.89 | 0.39 | 1.3 | 9.0 | 16.6 | 28.1 | 20 |
| Comparative Example 1 | 0.24 | 0.39 | — | — | — | 21.6 | 80 |
| Comparative Example 2 | 0.24 | 0.31 | — | — | — | 28.0 | 75 |
| Comparative Example 3 | 0.64 | 0.31 | 1.0 | 7.0 | 18.4 | 28.6 | 45 |
| Comparative Example 4 | 0.44 | 0.31 | 1.0 | 7.0 | 20.1 | 28.4 | 40 |
| Comparative Example 5 | 3.36 | 3.36 | 1.1 | 2.0 | 16.5 | 16.8 | 8 |
| Comparative Example 6 | 3.11 | 0.31 | 2.4 | 9.0 | 16.4 | 26.4 | 60 |
| Comparative Example 7 | 3.11 | 0.31 | 2.7 | −11.0 | 16.5 | 17.8 | 75 |
| Comparative Example 8 | 3.11 | 0.31 | 1.0 | 9.0 | 10.1 | 17.1 | 60 |
| Comparative Example 9 | 3.11 | 0.31 | 1.0 | 9.0 | 13.5 | 19.1 | 55 |

Examples 1 to 6 to which the present invention was applied were excellent in the curl suppressing property and strength.

Comparative Examples 1 to 4 and 6 to 9 were inferior in the curl suppressing property.

In Comparative Example 5, sufficient strength was not obtained.

INDUSTRIAL APPLICABILITY

According to the present invention, it is possible to provide a laminated foam sheet having a non-slip surface, excellent strength, and an excellent curl suppressing property, and a molded article thereof.

REFERENCE SIGNS LIST

1 Laminated foam sheet
10 Foam layer
20 First non-foam layer
30 Second non-foam layer
2 Floor mat for a vehicle
3 Undercover for a vehicle
4 Luggage tray for a vehicle
5 Luggage tray for a vehicle

The invention claimed is:
1. A laminated foam sheet comprising: a foam layer having a first surface and a second opposed surface;

a first non-foam layer positioned on the first surface of the foam layer; and
a second non-foam layer positioned on the second surface of the foam layer,
wherein the foam layer includes a polyolefin-based resin,
the foam layer has a thickness of 2.0 to 6.0 mm,
the foam layer has a closed cell ratio of 70% or more,
the first non-foam layer includes a non-cross-linked olefin-based elastomer,
the first non-foam layer has a maximum static friction coefficient determined by JIS K7125 of 2.0 or more,
the second non-foam layer comprises a polyolefin-based resin and has a maximum static friction coefficient determined by JIS K7125 of 1.0 or less, and
a ratio represented by [basis weight of first non-foam layer (a)]/[basis weight of second non-foam layer (b)] is 0.5 to 2.0.

2. The laminated foam sheet according to claim 1, wherein a difference between a melting point of a resin forming the first non-foam layer and a melting point of a resin forming the second non-foam layer is within 10° C.

3. The laminated foam sheet according to claim 1, wherein the polyolefin-based resin is a polypropylene-based resin.

4. The laminated foam sheet according to claim 1, wherein the second non-foam layer has a piercing strength determined by JIS K7171 of 20 N or more.

5. A molded article obtained by molding the laminated foam sheet according to claim 1.

6. The molded article according to claim 5, wherein the first non-foam layer is formed on a surface facing downward in a vertical direction.

7. The molded article according to claim 5, which is a floor mat for a vehicle.

8. The molded article according to claim 5, which is an undercover for a vehicle.

9. The molded article according to claim 5, which is a luggage tray for a vehicle.

* * * * *